United States Patent
Pawlowski

(10) Patent No.: US 7,885,519 B2
(45) Date of Patent: Feb. 8, 2011

(54) AUDIO/VIDEO DEVICE WITH REPLAY FUNCTION AND METHOD FOR HANDLING REPLAY FUNCTION

(75) Inventor: Adam Pawlowski, Zielona Gora (PL)

(73) Assignee: Advanced Digital Broadcast S.A., Chambesy (CH)

( * ) Notice: Subject to any disclaimer, the term of this patent is extended or adjusted under 35 U.S.C. 154(b) by 1085 days.

(21) Appl. No.: 11/612,736

(22) Filed: Dec. 19, 2006

(65) Prior Publication Data
US 2007/0143820 A1    Jun. 21, 2007

(30) Foreign Application Priority Data
Dec. 21, 2005    (EP) .................................. 05461006

(51) Int. Cl.
*H04N 5/92* (2006.01)
*H04N 5/84* (2006.01)
(52) U.S. Cl. ...................... 386/326; 386/334
(58) Field of Classification Search ............... 386/326, 386/334, 332, 337, 345, 347, 291
See application file for complete search history.

(56) References Cited

U.S. PATENT DOCUMENTS 5,371,551 A    12/1994    Logan et al.

2003/0035550 A1 *    2/2003    Kimura .................. 381/66
2007/0189544 A1 *    8/2007    Rosenberg ............. 381/57

FOREIGN PATENT DOCUMENTS

| WO | 98/51076 A1 | 11/1998 |
| WO | 02/03683 A2 | 1/2002 |
| WO | 03/019945 A1 | 3/2003 |
| WO | 03/067594 A1 | 8/2003 |
| WO | 03/085938 A2 | 10/2003 |

* cited by examiner

*Primary Examiner*—Robert Chevalier
(74) *Attorney, Agent, or Firm*—Matthias Scholl, PC; Matthias Scholl

(57) ABSTRACT

The present invention relates to an audio/video device (100) with a replay function containing a stream source (101) providing a replayable audio/video data stream, a user interface (108) for inputting stream play requests, a stream processor (102) coupled to the stream source (101) and to the user interface (108) providing stream play status and processing the stream according to the stream play requests, a tag memory (106) and a microphone (103) receiving ambient sound. To the microphone is coupled an ambient sound analyzer (104) detecting disturbing events, to which is coupled an audio events memory (109) and a tag manager (105) coupled to the stream processor (102) and to the tag memory (106), which upon detecting a disturbing event, generates a disturbing event tag according to stream play status and stores the tag in the tag memory (106), to which is coupled a replay manager (107) coupled to the stream processor (102) and handling stream replay requests by directing a replay of the stream from a point associated with a disturbing event tag.

16 Claims, 6 Drawing Sheets

AUDIO/VIDEO DEVICE WITH REPLAY FUNCTION AND METHOD FOR HANDLING REPLAY FUNCTION

CROSS-REFERENCE TO RELATED APPLICATIONS

This application claims priority to the European Patent Application No. EP05461006.8, filed Dec. 21, 2005, the contents of which are incorporated herein by reference.

BACKGROUND OF THE INVENTION

1. Field of the Invention

The object of the invention is an audio/video device with a replay function and a method for handling a replay function.

2. Brief Description of the Background of the Invention Including Prior Art

The current audio/video devices, such as DVD players or digital television set-top boxes, provide users with a simple, user-friendly interface. The users appreciate intuitive interfaces, which offer automatic assistance by predicting the most likely user requests. However, such interfaces are still far from perfect and require considerable improvements to assist the user in unexpected situations.

One of such situations, in which the current interfaces do not assist the user, occurs when the user is disturbed while watching a television program or a DVD movie. For example, the disturbance may be due to a phone call, an unexpected guest or another member of a household. After the disturbance ends and the user returns to watching, it is often necessary to replay the missed portion. However, the user may be confused as to how much of the audio/video material needs to be replayed and has to search through it manually, which can be time-consuming.

The aforementioned problem is partially solved by using a "pause" feature once the disturbance occurs. The activated "pause" feature, when playing a DVD movie, simply stops the playing, which can be resumed later. In case of digital television set-top boxes equipped with a digital video recording system, the recording system may begin recording the currently watched program on a hard disk to enable its later delayed playback, often called a "time-shift" feature. An exemplary digital video recording system can be found in a U.S. Pat. No. 5,371,551 "Time delayed digital video system using concurrent recording and playback", which refers to a device comprising a circular buffer which constantly records incoming audio/video signals and allows delayed replay of the stored material.

The user may also partially solve the aforementioned problem by creating a tag, also called a bookmark, at a specific point of the played audio/video material. An exemplary tagging system is known from the publication No. WO03067594, entitled "Centralized digital video recording system with bookmarking and playback from multiple locations". A tag defines a point in the audio/video material, which can be quickly identified without manual searching within the material.

In turn, the publication No. WO 03/019945 A1 entitled "System and method for mitigating interruptions during television viewing" teaches that in response to an incoming communication request or other interruption, a television signal being currently displayed by an interactive television system is buffered for subsequent playback. The playback of the television signal being buffered in this system may commence when the request is rejected.

In addition, the publication No. WO 03/085938 A2 entitled "Communications terminal device allowing content reception and voice communication" teaches a terminal, in which a content reproduction section reproduces a video signal and an audio signal from a received transport stream. The content reproduction section is also made operable to reproduce the video signal and the audio signal from the transport stream read from the content storage section in an event that voice communication is started during reception/reproduction of contents.

The publication WO 02/03683 A2 entitled "Advanced set top terminal having a program pause feature with voice-to-text conversion" teaches a system for automatically pausing a video program in response to detection of the occurrence of communications event, audio communication event, interactive services, or triggering event.

Furthermore, the publication WO 98/51076 entitled "Time-shifting apparatus and auto-edit system" teaches a method and time shifting event recorder capable of recording portions of a time sequential signal representing an event so that a representation of the event can be produced in a time shifted manner.

However, there often occur disturbing situations when the user does not have the time to issue a pause command or insert a tag. In case of emergencies, unexpected calls, repetitive disturbances, the user may stop watching the material without identifying the point where it was stopped.

SUMMARY OF THE INVENTION

Purposes of the Invention

It is an object of the present invention to provide a user with an assisted replay function, predicting the points in the material to which the user would most likely return after a disturbing event has occurred, without requiring any actions from the user at the moment of the disturbing event.

This and other objects and advantages of the present invention will become apparent from the detailed description, which follows.

BRIEF DESCRIPTION OF THE INVENTION

According to the invention, the audio/video device comprises a source of replayable audio/video data, a stream processor, a system for detecting disturbing events, a system for managing tags, a reply manager, a user interface and a microphone (or a set of microphones) for monitoring ambient sounds in the vicinity of the user. The detection of a disturbing event corresponds to the detection of an ambient sound by the microphone. The microphone is connected to an ambient sound analyzer. Once a sound has been registered, the analyzer—after checking that this sound does not come from the audio/video stream being played—may classify the sound as connected with a disturbing event, thus recording an occurrence of a disturbing event. For this purpose an audio events memory, containing patterns of disturbing and/or negligible sounds, may be used. The disturbing sounds may be additionally characterized by their significance. If a disturbing event is recorded then the tag manager generates a tag and stores it in a tag memory. The tag specifies a certain point in the stream, associated with the point at which the event occurred, wherein the association does not have to be direct. Additional information concerning the disturbing event may be associated with the tag and stored. Upon user request the audio/video stream is replayed from a tag selected from stored tags. For convenience, a list of the stored tags may be generated and presented to the user. Particular embodiments of the inventive device include a player of a portable data carrier, preferably a DVD player, or a digital television set-top box.

The idea of the invention is also a method for handling the reply function, utilizing the inventive device, while the elements of the inventive device mentioned here (such as the ambient sound analyzer, tag manager etc.) may be implemented using hardware or software, separately or combined together in modules. The inventive method comprises monitoring the ambient sound during playing the data stream, and upon detecting a disturbing event, generating a disturbing event tag according to stream play status and storing the tag in the tag memory, selecting a tag from the tag memory upon receiving a stream replay request and directing the stream processor to replay the stream from the point associated with the selected tag.

It is advantageous when the stream source comprises a digital television signal receiving block coupled with a DVR system with a time shift buffer, and there it is a possibility to active the recording of the currently received stream in the time shift buffer upon detecting a disturbing event or the stream source comprises a digital television signal receiving block coupled with a DVR system with a recordings buffer, and there it is a possibility to active the recording of the currently received stream in the recordings buffer upon detecting a disturbing event or the stream source comprises a digital television signal receiving block coupled with a DVR system with a time shift buffer and a recordings buffer, and there it is a possibility to active the recording of the currently received stream in the recordings buffer and copying the contents of the time shift buffer to the recordings buffer upon detecting a disturbing event.

All stored tags can be deleted in case no stream replay request was received in a predetermined time after the last detected disturbing event.

Preferably, the disturbing are sound events of a predetermined level.

It is favorable that the device comprises an audio events memory with a set of disturbing characteristics, and the disturbing events are events with characteristics corresponding to one of the characteristics in the set.

Preferably, disturbing events characteristics include a significance of the event, and upon receiving a stream replay request, the tags are selected in order of significance.

It is also favorable that the device comprises an audio events memory with a set of negligible events characteristics, which are not to be detected as disturbing events.

A list of stored tags for selection by the user can be displayed upon receiving a stream replay request.

Preferably the displayed list of stored tags includes a point of occurrence, a type of event, a time at which the event occurred, and/or the offset from the current time.

BRIEF DESCRIPTION OF THE DRAWINGS

The invention will now be described by way of example and with reference to the accompanying drawings in which.

DESCRIPTION OF INVENTION AND PREFERRED EMBODIMENT

The assisted replay function is provided by the present invention by monitoring ambient sounds while watching an audio/video material, and upon detecting a disturbing ambient event, generating a disturbing event tag and storing the tag in a tag memory. Later, upon receiving a replay request, a tag is read from the tag memory and the material is replayed from the point associated with the tag.

Figure 1:
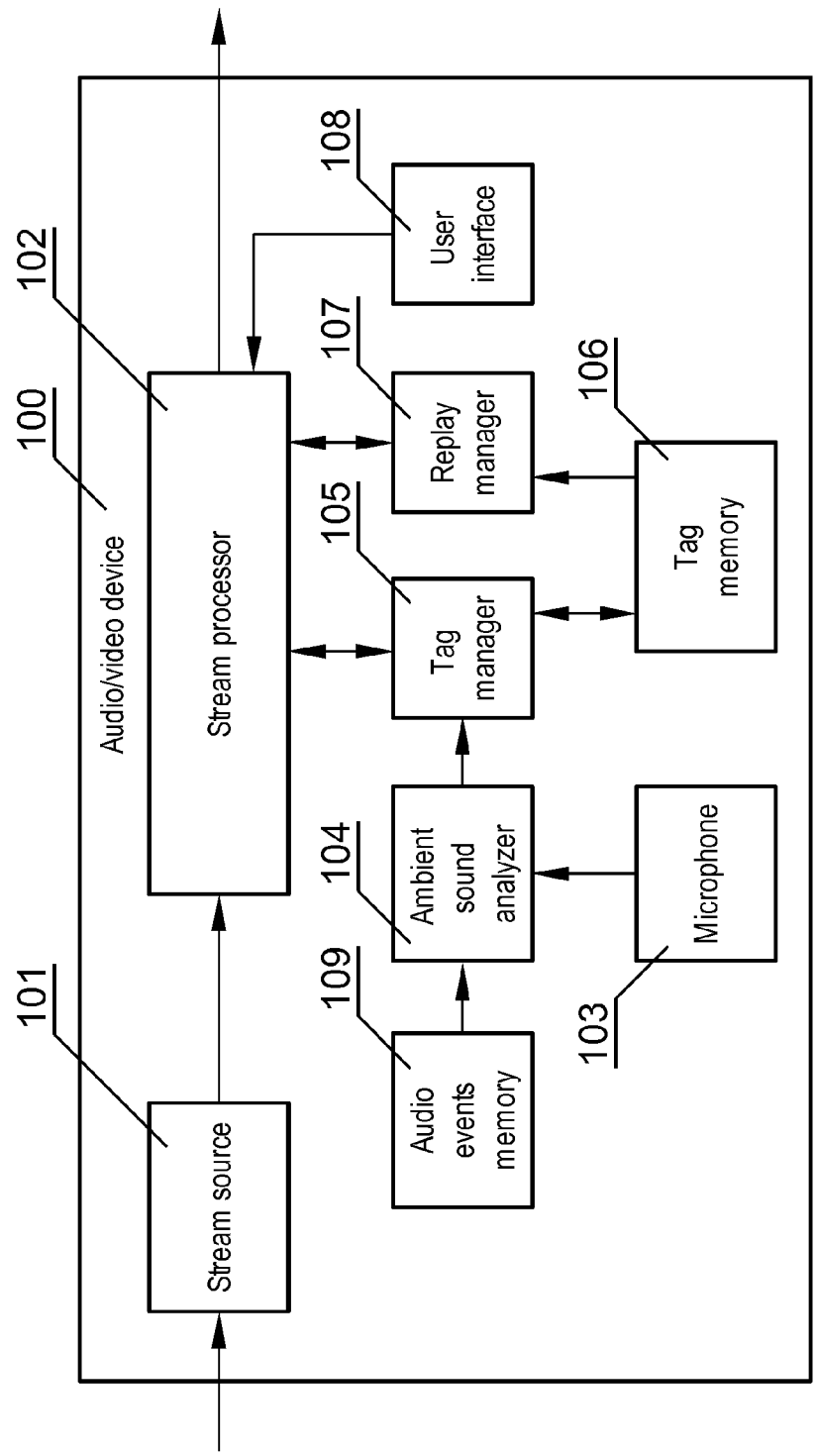
FIG. 1 shows a first, general embodiment of an audio/video device.

FIG. 1 presents a first, general embodiment of an audio/video device 100 according to the invention. The device can be a digital television set-top box, as described in more details in FIG. 7, a DVD player, as described in more details in FIG. 6, or any other audio/video device comprising elements equivalent to those shown in FIG. 1. The elements shown in FIG. 1 are to be treated as functional blocks, they may be implemented as hardware or software, separately or combined together in modules. The device comprises a stream source 101, which provides a stream of data describing audio/video materials. The audio/video data stream is replayable, i.e. it can be replayed from a specified point on a request from a stream processor 102. The stream processor 102 receives the stream and performs all stream processing procedures necessary to play the stream. The stream processor 102 also provides a stream play status, such as information whether a stream is currently played and what is the current stream position. The stream processor may be a single block or a set of cooperating blocks. The user may control stream processing routines by a user interface 108, such as a remote control unit, a keyboard, a voice interface or a touch screen interface. Especially, the user interface can be used to input stream navigation requests, such as stream play request (to initiate stream playing) or stream replay requests, as shown in more details in FIG. 4.

The audio/video device 100 further comprises a microphone 103, which receives ambient sound. The microphone can be placed at casing of the device or can be coupled with a remote control interface, which is usually close to the user, to receive ambient sound surrounding the user. Alternatively, a set of microphones may be placed in the vicinity of the device to receive all ambient sounds in the room in which the device 100 is installed.

The sound received by the microphone is input to an ambient sound analyzer 104, which is used to detect disturbing events. The ambient sound analyzer allows subtracting from the ambient sound the audio generated by the device 100 itself, thus being able to analyze the sounds produced by sound sources other than the audio/video device 100. The ambient sound analyzer 104 monitors the microphone signal to find disturbing events therein. In a simplest embodiment, these can be any audio events with loudness greater than a predetermined level. In a more elaborate embodiment, the characteristics of the disturbing events can be stored in an audio events memory 109, such as representation of sounds of a doorbell, a phone ring, specific words or a kitchenware alarm. In particular, specific words (such as "stop") may be used to initiate inserting a tag. Furthermore, the audio events memory 109 may store characteristics of events which are not to be treated as disturbing events, such as frequent sounds to which the user does not respond, for example the sounds of a clock bell, dog barking, etc. The characteristics of both disturbing and not disturbing events can be pre-programmed in the device, or can be programmed by the user. A special software may be provided to the user for recording specific sounds and classifying them as disturbing or not disturbing.

The ambient sound analyzer 104 inputs notifications of a detected disturbing event to a tag manager 105, coupled to the stream processor 102. The tag manager monitors whether a stream is currently played. If so, and if an indication of a disturbing event is received, the tag manager 105 generates a tag according to stream play status and stores it in the tag memory 106, according to the procedure shown in FIG. 3.

A replay manager 107 coupled to the stream processor 102 and to the tag memory 106 handles stream replay requests input by the user interface 108. It can be coupled directly to the user interface 108 or can take over a specific function of the stream processor related to a replay request. The replay manager 107 directs the stream processor 102 to replay the stream from a point associated with a disturbing event tag, according to the procedure shown in FIG. 4.

Figure 2:
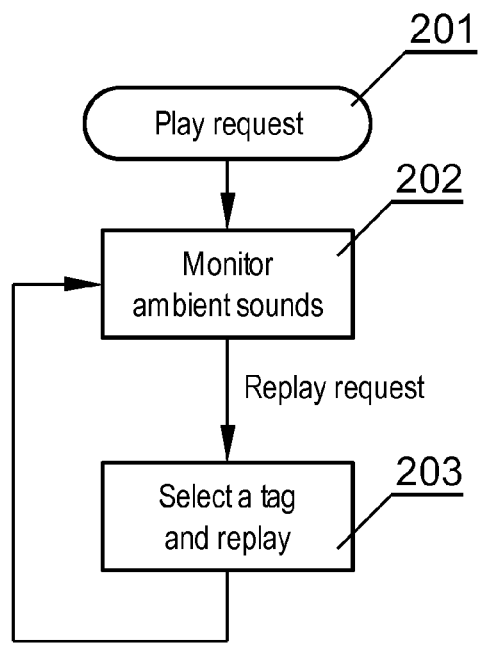
FIG. 2 presents a general procedure of operation of the device.

FIG. 2 presents a general procedure of operation of the device relevant to the assisted replay function. When the stream play is initiated by a play request input by the user in step 201, the ambient sounds are monitored in step 202 by the ambient sound analyzer and disturbing event tags are generated and stored in the tag memory according to the procedure shown in FIG. 3. Upon receiving a replay request, in step 203 a tag is selected from the tag memory and the stream processor is directed to replay the stream from the point associated with the selected tag, according to the procedure shown in FIG. 4. During the replay, ambient sounds may be further monitored in case another disturbance occurs. The user may also issue another request for replay, in order to change the point, from which the stream is replayed.

Figure 3:
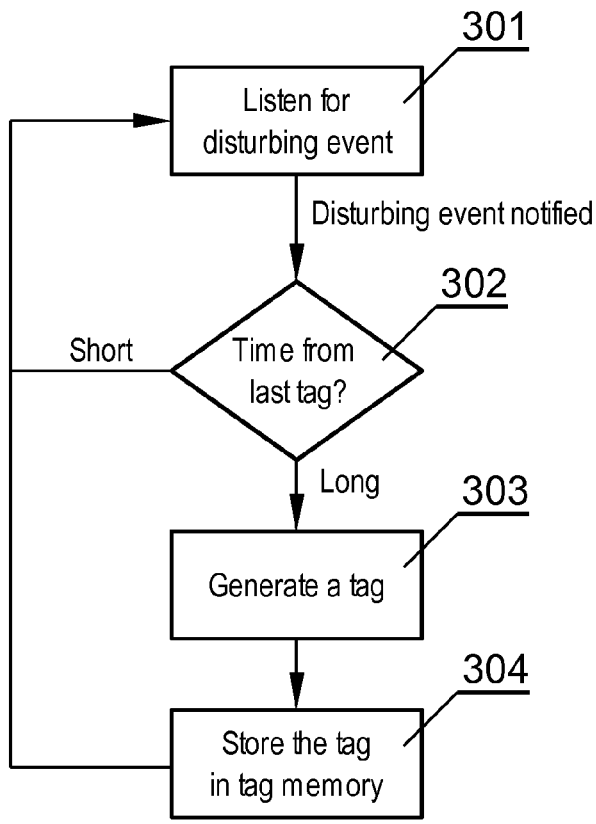
FIG. 3 presents a detailed procedure for monitoring ambient sounds.

FIG. 3 presents a detailed procedure for monitoring ambient sounds by the tag manager. The tag manager listens for a disturbing event notification from the ambient sound analyzer in step 301. When a disturbing event is detected in step 302, the tag manager may check if the time difference between the current event and the last stored event is less than a predefined time, for example 1 minute, and if so, listen for another event. This may limit the number of stored tags. When the time difference is large, then a disturbing event tag is generated in step 303. The tag specifies a certain point in the stream, associated with the point at which the event occurred. The association may be direct, i.e. the tag may specify the exact point in the stream at which the event occurred, or indirect, i.e. the tag may specify a point offset from the point of event occurrence, such as 30 seconds earlier for enabling the user to get acquainted with the fragment that was missed, or may define a beginning of the scene during which the event occurred. The tag may also include the identifier of the event, read from the audio events memory. Alternatively, the tag may also include a recording of the disturbing event. Furthermore, the tag may also include the time of occurrence of the event, i.e. the "outside" time. Next, the tag is stored in the tag memory in step 304 and the tag manager continues listening for further disturbing event notifications. The tags may be stored in a single file for all recordings, or a separate file may be stored for each recording.

Figure 4:
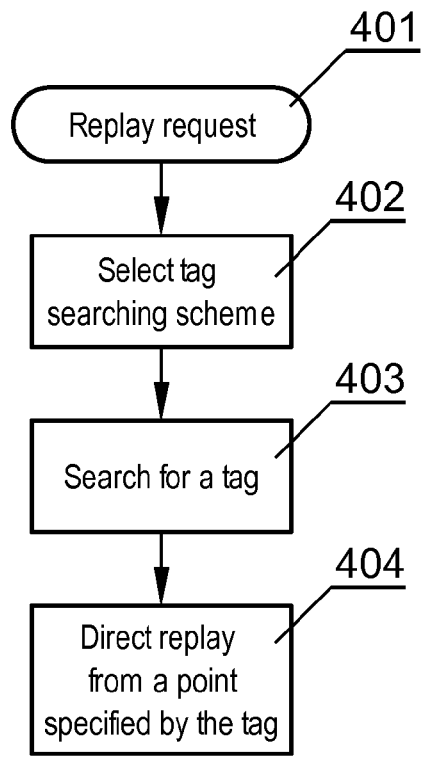
FIG. 4 presents a procedure for handling replay requests.

FIG. 4 presents a procedure for handling the replay of the stream by the replay manager, initiated by receiving a replay request in step 401. The replay request may be a forward or backward request, i.e. it may be related to replaying a previous fragment or a next fragment of the stream in relation to the currently watched. The forward request may be input by the user in case a previous backward replay request resulted in moving to a point in the stream, which was already watched. Next, the replay manager selects a tag searching scheme in step 402. The tags may be searched in several ways, including:

searching the oldest available tag, in order to replay the stream from the first detected disturbing event, searching the latest available tag, in order to replay the stream from the last detected disturbing event, searching for the tag corresponding to the event with the highest significance, which may be applicable to situations, in which the user is often disturbed by a particular type of disturbance, such as a sound of telephone ring or a door bell, or when the user gives a voice command to insert a tag.

Next, the tag is searched for in step 403 and read from the tag memory. The replay manager then directs the stream processor to replay the stream from the point associated with the tag in step 404.

Figure 5:
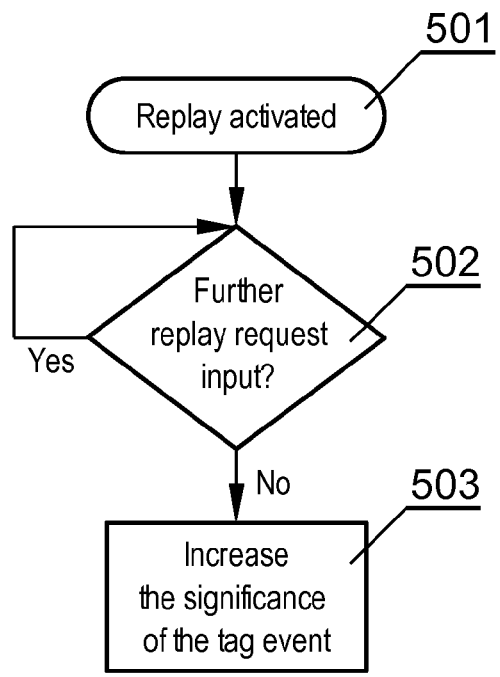
FIG. 5 presents a procedure for monitoring the tag usage.

FIG. 5 presents a procedure for monitoring the tag usage by the replay manager in order to determine the disturbing events corresponding to the most frequently used tags. When a replay request is received in step 501, the procedure waits for a predefined time in step 502, for example 10 seconds, for a further replay request. If a further replay request is input in this period, it suggests that the user was not interested in the previous tag. This could be due to an event mistakenly classified as disturbing. When no further replay request is issued, this suggests that the user is satisfied with the selected tag. Then, the significance of the disturbing event corresponding to the selected tag is increased in step 503. The event significance can be stored in the audio events memory, for example as a number representing the number of times the particular type of the event was accepted for replay.

Figure 6:
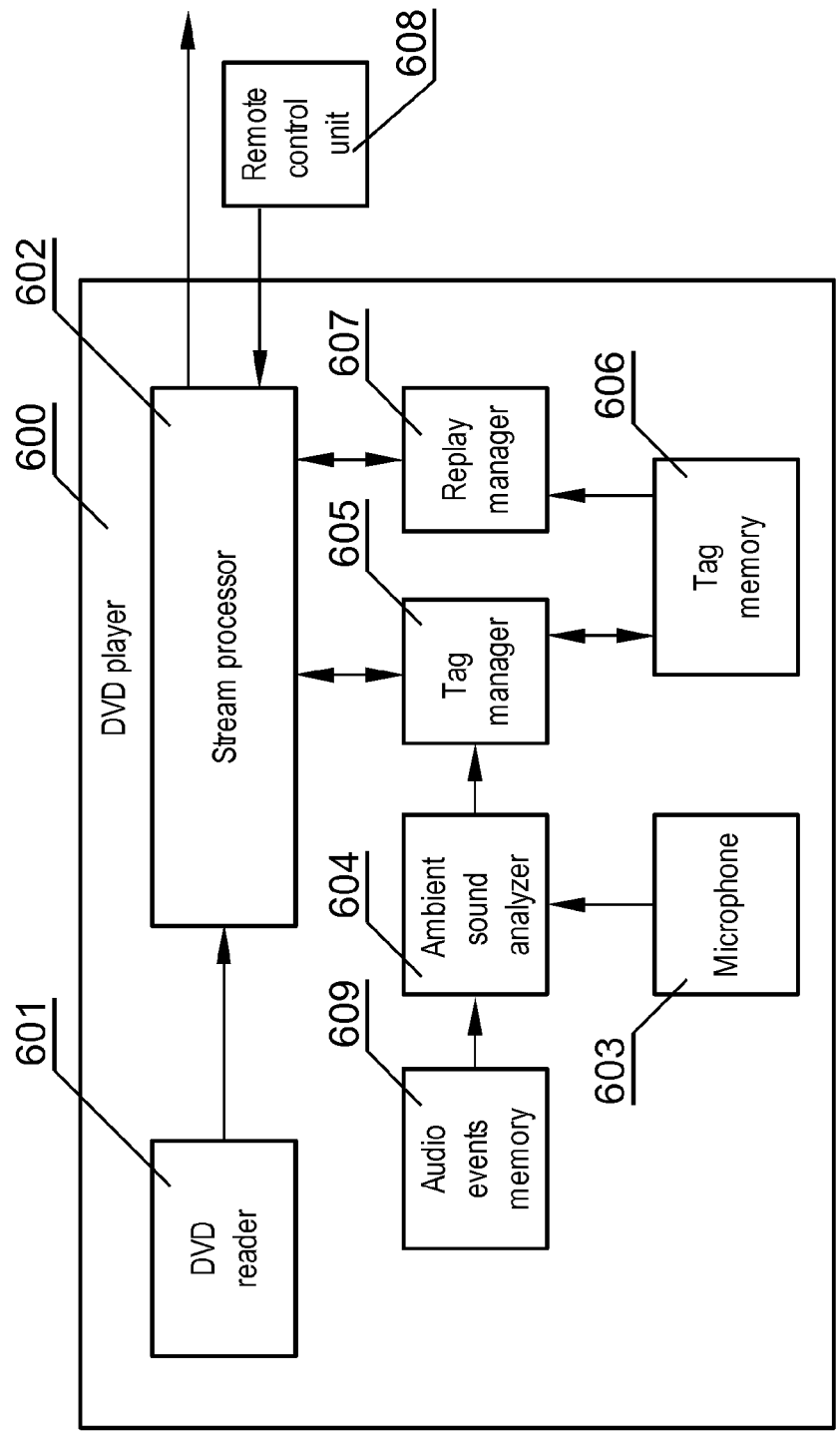
FIG. 6 presents a second, detailed embodiment of the device as a DVD player.
Figure 7:
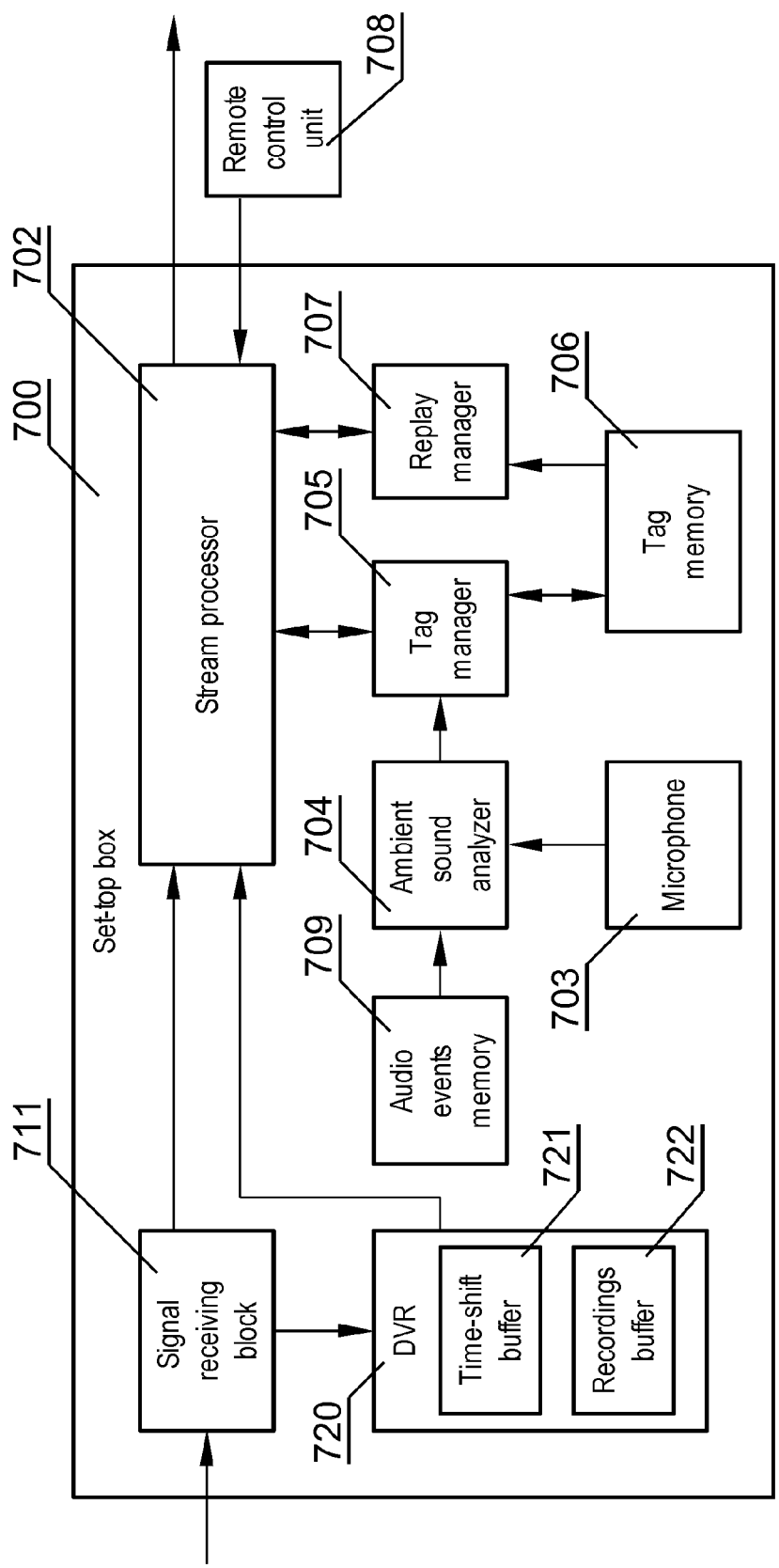
FIG. 7 presents a third, detailed embodiment of the device as a digital television set-top box.

FIG. 6 presents a second, detailed embodiment of the device as a DVD player 600. Alternatively, this can be another type of device having a portable data carrier as the stream source, such as a Video Compact Disc, a solid-state memory card (for example, a Compact Flash card), a hard disk, or other equivalent source. The audio events memory 609 is a dedicated fragment of a non-volatile memory of the DVD player, for example a Flash memory. The tag memory 606 is a dedicated fragment of a RAM memory of the DVD player. The other elements are analogous to the corresponding elements of the general embodiment shown in FIG. 1 that means that the DVD player 600 also consists of a stream source 601, a stream processor 602, a microphone 603, an ambient sound analyzer 104, a tag manager 605, a replay manager 607 and a user interface 608. FIG. 7 presents a third, detailed embodiment of the device as a digital television set-top box 700. The stream source comprises a signal receiving block 711, receiving a digital television stream, such as a cable, satellite, terrestrial or IP television stream. A digital video recording DVR system 720, for example hard-disk based, is coupled with the signal receiving block 711 and the stream processor 702. The DVR system has a time-shift buffer 721 for recording the currently received television stream to enable time-shift functions, including a replay function. The DVR system 720 may also store recordings for future viewing in a recordings buffer 722, for which assisted replay is also possible. The configuration of signal flow between the signal receiving block 711, the DVR system 720 and the stream processor 702 is exemplary only and a similar function can be achieved using other signal flow paths. The remaining elements of the DVD player 700 are: a stream source 701, a microphone 703, an ambient sound analyzer 704, a tag manager 705, a tag memory 706, a replay manager 707, a user interface 708 and an audio events memory 609, and are analogous to the elements shown in FIG. 1.

Figure 8:
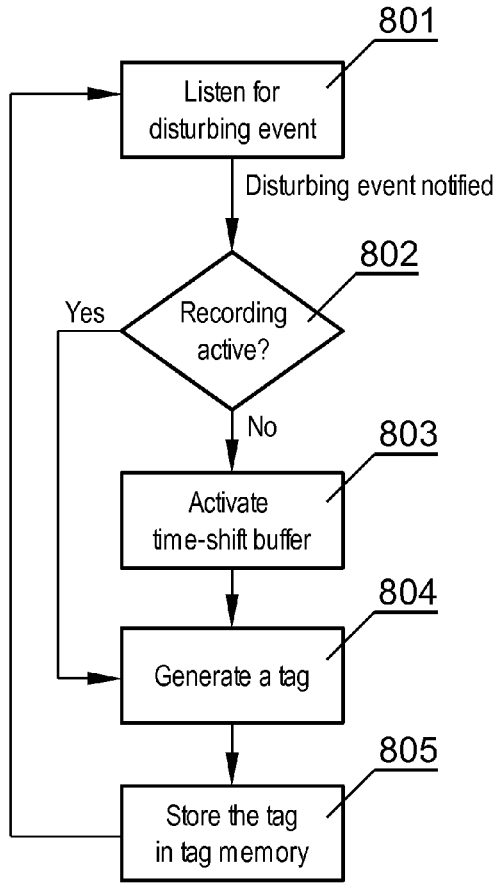
FIG. 8 shows a flow diagram of the first procedure of monitoring ambient sounds.

FIG. 8 shows a first procedure for monitoring ambient sounds by the tag manager in a digital television set-top box shown in FIG. 7. In step 801 the tag manager listens for a disturbing event notification from the ambient sound analyzer. When a disturbing event is detected, the tag manager checks in step 802 whether the time shift function of the DVR system is active. If not, the recording in the time-shift buffer is activated in order to allow later replay of the stream in step 803. Next, a tag is generated in step 804 and stored in the tag memory in step 805 and the tag manager continues listening for further disturbing event notifications. This allows efficient use of a time shift buffer, as the time shift buffer is activated only when necessary.

Figure 9:
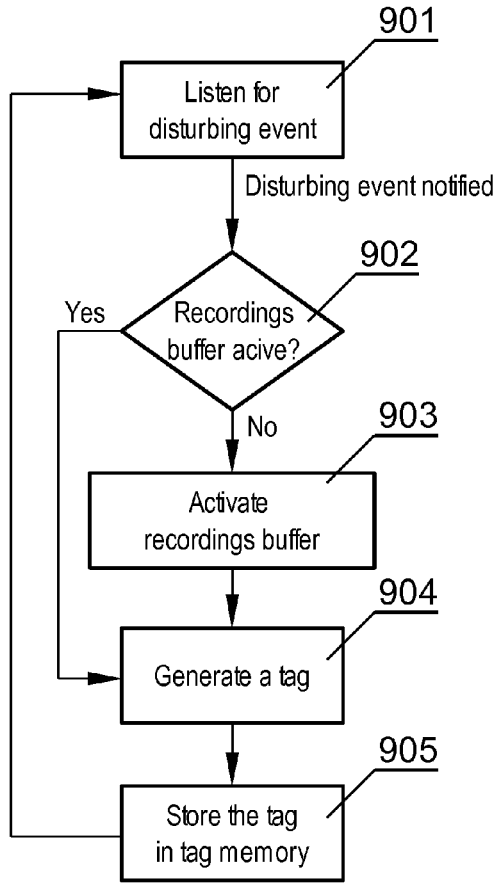
FIG. 9 shows a flow diagram of the second procedure for monitoring ambient sounds.

In another embodiment, the time shift buffer may be always active. However, it may have a limited capacity, for example several minutes only. In case of longer disturbances, the user might be interested in a replay from an earlier point than the length of the time shift buffer. Moreover, the user may be interested in a replay from a point earlier than the time of occurrence of the disturbance, such as the beginning of a scene. FIG. 9 shows a second procedure for monitoring ambient sounds by the tag manager in a digital television set-top box shown in FIG. 7, solving the aforementioned problem. In step 901 the tag manager listens for a disturbing event notification from the ambient sound analyzer. When a disturbing event is detected, the tag manager checks in step 902 whether the recordings buffer is active, i.e. whether the signal is recorded in the recordings buffer or in the time shift buffer. When the recordings buffer is not active, it is activated in step 903. The time shift buffer may remain active or may be deactivated. The recordings buffer may be activated by starting recording from the current time. Alternatively, upon its activation, the contents of the time shift buffer may be copied to the recordings buffer in order for the recordings buffer to contain material prior to the occurrence of the disturbing event. Next, a tag is generated in step 904 and stored in the tag memory in step 905 and the tag manager continues listening for further disturbing event notifications.

Figure 10:
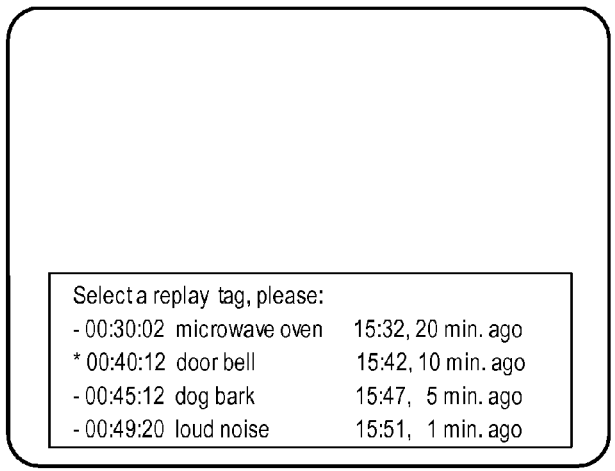
FIG. 10 presents an exemplary graphical interface presented to the user.

FIG. 10 presents an exemplary graphical interface presented to the user upon performing a replay function. The interface presents a list of stored tags as a graphic window overlaid over a video layer. The list may include both the disturbing event tags and other types of tags, such as user-defined tags. The tags are sorted in order of occurrence, from the latest to the earliest. Each tag is characterized by the point of occurrence, the type of event, the time at which the event occurred, and/or the offset from the current time. The offset from the current time may allow the user to easily select the tag when the user is aware that the disturbing event occurred for example 15 minutes earlier. The list suggests, which tag will be selected as the next one when a further replay (forward or backward) request will be input.

The preferred embodiments having been thus described, they will now be evident to those skilled in the art that further variation thereto may be contemplated. Such variations are not regarded as a departure from the invention, the true scope of the invention being set forth in the claims appended hereto.

What is claimed is:

1. An audio/video device with a replay function comprising a stream source (101) providing a replayable audio/video data stream;
   a user interface (108) for inputting stream play requests;
   a stream processor (102) coupled to the stream source and to the user interface providing stream play status and processing the stream according to the stream play requests;
   a tag memory (106);
   a microphone (103) receiving ambient sound;
   an ambient sound analyzer (104) coupled to the microphone (103) and detecting disturbing events;
   a tag manager (105) coupled to the ambient sound analyzer (104), the stream processor (102) and to the tag memory (106), wherein the tag manager upon detecting the disturbing event generates a disturbing event tag according to stream play status and stores the disturbing event tag in the tag memory (106); and
   a replay manager (107) coupled to the tag memory (106) and the stream processor (102) and handling the stream replay requests by directing a replay of the replayable audio/video data stream from a point associated with the disturbing event tag.

2. The audio/video device according to claim 1, wherein the stream source (101) comprises a digital television signal receiving block (711) coupled with a DVR system (720).

3. The audio/video device according to claim 2, wherein the DVR system (720) comprises a time shift buffer (721) activated upon detecting a disturbing event.

4. The audio/video device according to claim 2, wherein the DVR system (720) comprises a recordings buffer (722) activated upon detecting a disturbing event.

5. The audio/video device according to claim 1, wherein the ambient sound analyzer (704) is coupled to an audio events memory (709) storing a set of disturbing events characteristics and/or a set of negligible events characteristics.

6. A method for handling a replay function in an audio/video device, the device comprising a stream source providing a replayable audio/video data stream, a user interface for inputting stream play requests, a stream processor coupled to the stream source and to the user interface and providing stream play status and processing the replayable audio/video data stream according to the stream play requests, a tag memory and a microphone receiving ambient sound, comprising the steps of:
   monitoring the ambient sound during playing the replayable audio/video data stream, and upon detecting a disturbing event, generating an disturbing event tag according to stream play status and storing the tag in the tag memory; and
   selecting a disturbing event tag from the tag memory upon receiving a stream replay request and directing the stream processor to replay the stream from the point associated with the disturbing event tag.

7. The method according to claim 6, wherein the stream source comprises a digital television signal receiving block coupled with a DVR system with a time shift buffer, and wherein the method further comprises the step of activating the recording of the currently received stream in the time shift buffer upon detecting a disturbing event.

8. The method according to claim 6, wherein the stream source comprises a digital television signal receiving block coupled with a DVR system with a recordings buffer, and wherein the method further comprises the step of activating the recording of the currently received stream in the recordings buffer upon detecting a disturbing event.

9. The method according to claim 6, wherein the stream source comprises a digital television signal receiving block coupled with a DVR system with a time shift buffer and a recordings buffer, and wherein the method further comprises the step of activating the recording of the currently received stream in the recordings buffer and copying the contents of the time shift buffer to the recordings buffer upon detecting a disturbing event.

10. The method according to claim 6, further comprising the step of deleting all stored disturbing event tags in case no stream replay request was received in a predetermined time after the last detected disturbing event.

11. The method according to claim 6, wherein the disturbing events are ambient sounds of a predetermined level.

12. The method according to claim 6, wherein the device further comprises an audio events memory with a set of disturbing events characteristics, and the disturbing events are events with characteristics corresponding to one of the disturbing events characteristics in the set.

13. The method according to claim 12, wherein disturbing events characteristics include a significance of the event, and upon receiving a stream replay request, the tags are selected in order of significance.

14. The method according to claim 6, wherein the device further comprises an audio events memory with a set of negligible events characteristics, which are not to be detected as disturbing events.

15. The method according to claim 6, further comprising the step of, upon receiving a stream replay request, displaying a list of stored tags for selection by the user.

16. The method according to claim 15, wherein the displayed list of stored tags includes a point of occurrence, a type of event, a time at which the event occurred, and/or the offset from the current time.

* * * * *